(12) United States Patent
Donovan et al.

(10) Patent No.: US 7,894,952 B2
(45) Date of Patent: Feb. 22, 2011

(54) METHODS AND APPARATUS FOR ACCESSING VEHICLE ELECTRONIC SYSTEMS

(75) Inventors: Kenneth B. Donovan, Apalachin, NY (US); Henry Becker, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1127 days.

(21) Appl. No.: 11/603,320

(22) Filed: Nov. 21, 2006

(65) Prior Publication Data

US 2008/0120373 A1 May 22, 2008

(51) Int. Cl.
*G06F 7/00* (2006.01)
(52) U.S. Cl. .......................................... 701/36; 701/33
(58) Field of Classification Search .................. 701/22, 701/29, 33, 36; 180/53.8, 89.13
See application file for complete search history.

(56) References Cited

U.S. PATENT DOCUMENTS

| 7,254,468 B2 * | 8/2007 | Pillar et al. ................... 701/22 |
| 2004/0193420 A1 * | 9/2004 | Kennewick et al. ......... 704/257 |

* cited by examiner

*Primary Examiner*—Gertrude Arthur Jeanglaud
(74) *Attorney, Agent, or Firm*—Wolf, Greenfield & Sacks, P.C.

(57) ABSTRACT

One embodiment is directed to providing access between external systems and embedded vehicle electronic systems. That is, an interface module may receive information from a system external to the vehicle, determine an embedded system of the vehicle to which to provide the information, and provide the information to the embedded system. Similarly, the interface module may receive information a embedded electronic systems of a vehicle, determine a system external the vehicle to which to provide the information, and provide the information to the external system.

33 Claims, 4 Drawing Sheets

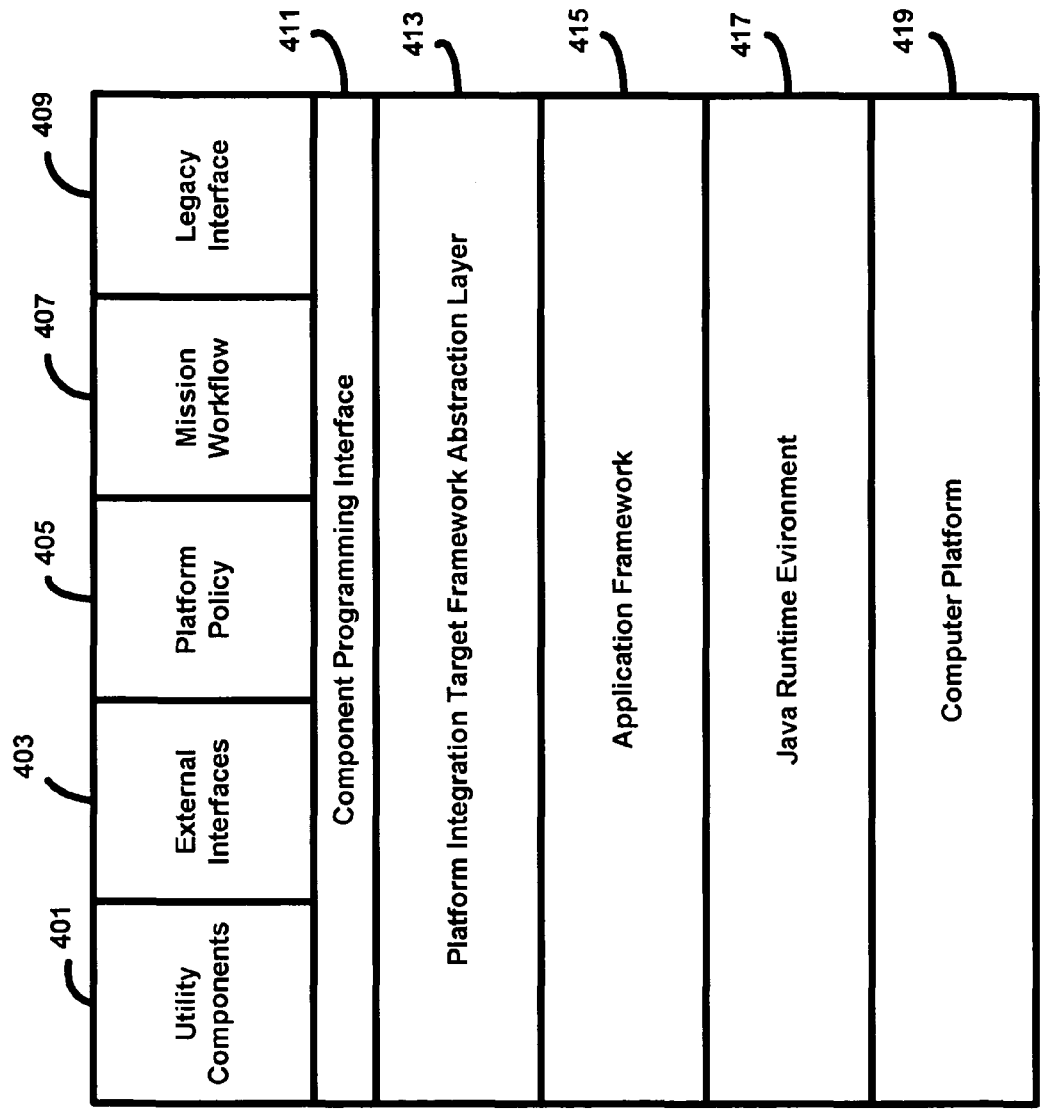

METHODS AND APPARATUS FOR ACCESSING VEHICLE ELECTRONIC SYSTEMS

BACKGROUND OF THE INVENTION

1. Field of Invention

The present invention relates to providing access between external systems and vehicle electronic systems.

2. Discussion of Related Art

The Global Information Grid (GIG) is a system to provide processing, storage, management, and transport of information to support military and defense operations. The GIG supports the new network-centric warfare doctrine of the military, which is to facilitate the sharing of information among geographically dispersed forces.

The ultimate goal of the GIG is to link all operating locations, including bases, posts, camps, stations, facilities, mobile platforms, and deployed sites. This is expected to increase information sharing, collaboration, and shared situational awareness, which allows for a greater degree of synchronization and mission effectiveness.

SUMMARY OF THE INVENTION

One embodiment of the invention is directed to a method of providing access to a plurality of embedded systems in a vehicle via an interface module comprising acts of: receiving, at the interface module, information from a system external to the vehicle; determining, at the interface module, at least one of the plurality embedded systems to which to provide the information; and providing the information from the interface module to the at least one of the plurality of embedded systems.

Another embodiment is directed to an interface module for providing access to a plurality of embedded systems in a vehicle comprising: at least one external interface configured to receive information from a system external to the vehicle; and at least one component to determine at least one of the plurality embedded systems to which to provide the information and provide the information from the interface module to the at least one of the plurality of embedded systems.

A further embodiment is directed to a method of providing access to a plurality of embedded systems in a vehicle via an interface module comprising acts of: receiving, at the interface module, information from at least one of the plurality of embedded systems; determining, at the interface module, at least one system external to the vehicle to which to provide the information; and providing the information from the interface module to the at least one system external to the vehicle.

Another embodiment is directed to a method of providing access to a plurality of embedded systems in a vehicle via an interface module having an internal network and a plurality of components that communicate via the internal network, wherein the components include at least one mission workflow component and at least one embedded system interface component. The method comprises acts of: receiving, at the interface module, information from a system external to the vehicle; determining, at the at least one mission workflow component, at least one of the plurality embedded systems to which to provide the information; and providing the information from the interface module to the at least one of the plurality of embedded systems via the at least one embedded system interface component.

A further embodiment is directed to an interface module for providing access to a plurality of embedded systems in a vehicle comprising: an internal network configured to receive information from a system external to the vehicle; and a plurality of components that communicate via the internal network, the plurality of components comprising at least one mission workflow component configured to determine at least one of the plurality of embedded systems to which to provide the information and at least one embedded system interface component configured to provide the information from the interface module to the at least one of the plurality of embedded systems.

Another embodiment is directed to a method of providing access to a plurality of embedded systems in a vehicle via an interface module having an internal network and a plurality of components that communicate via the internal network, wherein the components include at least one mission workflow component and at least one embedded system interface component. The method comprises acts of: receiving, via the at least one embedded system interface component, information from at least one of the plurality of embedded systems; determining, at the at least one mission workflow component, at least one system external to the vehicle to which to provide the information; and providing the information from the interface module to the at least one system external to the vehicle.

A further embodiment is directed to a method of providing access to a plurality of embedded systems in a vehicle via an interface module having an internal network and a plurality of components that communicate via the internal network, wherein each of the plurality of components is of a defined type, wherein each type of component has a predefined interface, wherein each component implements the predefined interface for its respective type. The method comprises acts of: receiving, at the interface module, information from a system external to the vehicle; determining, at the interface module, at least one of the plurality embedded systems to which to provide the information; and providing the information from the interface module to the at least one of the plurality of embedded systems.

Another embodiment is directed to an interface module that provides access to a plurality of embedded systems in a vehicle comprising: an internal network that receives information from a system external to the vehicle; and a plurality of components that communicate via the internal network and are configured to determine at least one of the plurality embedded systems to which to provide the information and provided the information from the interface module to the at least one of the plurality of embedded systems, wherein each of the plurality of components is of a defined type, wherein each type of component has a predefined interface, wherein each component implements the predefined interface for its respective type.

A further embodiment is directed to a method of providing access to a plurality of embedded systems in a vehicle via an interface module having an internal network and a plurality of components that communicate via the internal network, wherein each of the plurality of components is of a defined type, wherein each type of component has a predefined interface, wherein each component implements the predefined interface for its respective type, and wherein the method comprises acts of: receiving, at the interface module, information from at least one of the plurality of embedded systems; determining, at the interface module, at least one system external to the vehicle to which to provide the information; and providing the information from the interface module to the at least one system external to the vehicle.

BRIEF DESCRIPTION OF THE DRAWINGS

FIG. 4 is a block diagram of a component framework for an interface module, in accordance with one embodiment.

DETAILED DESCRIPTION

Figure 1:
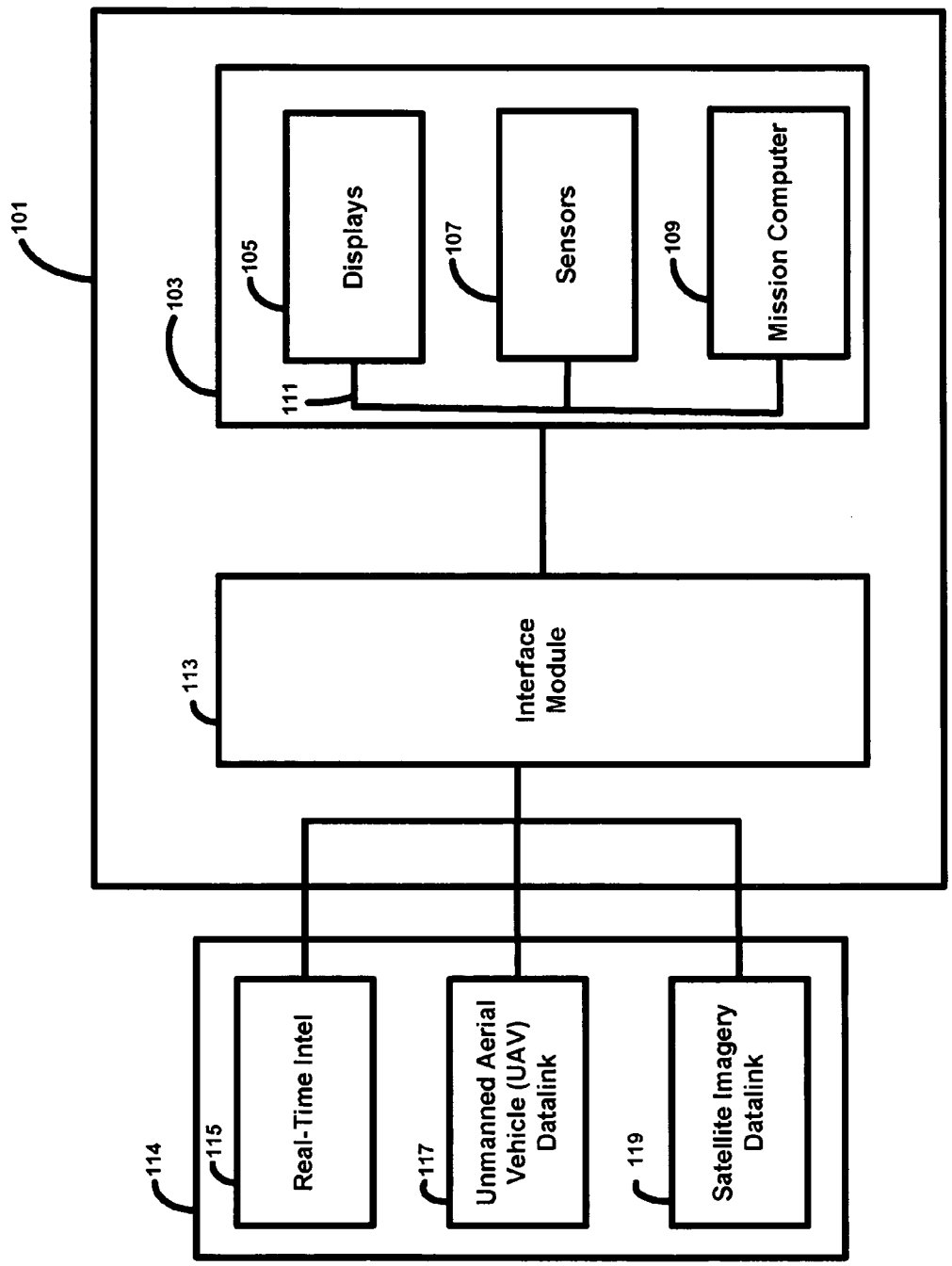
FIG. 1 is a block diagram of a system in which an interface module interfaces external systems with embedded electronic systems, in accordance with one embodiment of the invention.

Military and other vehicles typically have embedded electronic systems that are used for navigation, communication, instrumentation, management and control of onboard systems (e.g., engine control and weapons delivery), and other functions. These systems may include, for example, the avionics of aircraft as well the electronic systems of terrestrial and marine vehicles.

Applicants have appreciated that the embedded electronic systems of a vehicle are typically tightly integrated with each other. That is, such systems are typically designed to work together and frequently use specialized interfaces and/or protocols to accomplish this. Tight integration of the embedded systems of a vehicle helps ensure that the different on-board systems work together and helps to increase the safety and reliability of these systems, which is particularly important in military applications. However, such tight integration limits the ability of these systems to receive information from and provide information to off-board external systems.

That is, for example, during a mission the embedded systems of a helicopter may have only the information loaded prior to the mission and any information obtained via the on-board sensors. Thus, the pilot is limited to the information brought with him on the mission, information received from onboard sensors, and any information that can be communicated to him by voice over the radio. The embedded systems of the helicopter may not be capable of receiving or processing updated satellite images of a target or updated intelligence information on the location of enemies or targets.

Applicants have appreciated that it may be useful in many situations to provide embedded electronic systems with the capability to operate with external networks, so that updated information from external sources may be provided to the on-board systems and so that the on-board systems may provide information to external destinations. For example, it may be useful to provide these systems with the capability to receive information from and provide information to the GIG.

Applicants have further appreciated that it is undesirable to make significant modifications to the existing embedded systems to enable them to communicate with external systems. As mentioned above, the on-board systems of a vehicle are tightly integrated by design to assist in assuring safety and reliability. Making significant modifications to these components may jeopardize their reliability and/or may require lengthy security or safety re-certifications. Further, modifying a vehicle's existing electronic systems to incorporate network-centric capabilities (i.e., the capabilities to communicate with external networks) may require making the same modifications to multiple components, thereby requiring a duplication of effort.

Thus, some embodiments of the invention are directed to an interface module that acts as an interface between a vehicles on-board electronic systems and external (i.e., off-board) networks and systems. Some embodiments may address the above-described drawbacks of embedded electronic systems. However, the invention is not limited in this respect, as not every embodiment addresses every drawback described above and some embodiments may not address any of these drawbacks. Further, it should be appreciated that the term "vehicle" as used herein, includes any mobile carrier (manned or unmanned), such as airborne vehicles (e.g., airplanes and helicopters), terrestrial vehicles (e.g., trucks, tanks, vans, cars), marine vehicles, and/or any combination thereof. The invention is not limited to use in military vehicles, as some embodiments are equally suited for use in civilian vehicles.

In one embodiment, shown in FIG. 1, a vehicle 101 includes embedded electronic systems 103 and an interface module 113. The embedded electronic systems may include, for example, on-board displays 105, sensors 107, and mission computer 109. Displays 105 may include, for example, monitors, gauges, or other display devices that display information to a human (e.g., the vehicle operator or a passenger). Sensors 107 may include for example, sensors used to monitor the mechanical systems of the vehicle, sensors that provide data for computing speed, altitude, position, or other vehicle status information, sensors used to monitor external environmental conditions, or any other suitable type of sensor. Mission computer 109 may be a computer that assists in navigation, mission planning, and other control functions. These devices may communicate with each other, for example, via legacy network 111 and may communicate with external systems 114 via interface module 113.

The external systems may include, for example, real-time intelligence feeds 115 which provide intelligence information, an unmanned aerial vehicle datalink 117 which provides imagery and/or other information obtained from UAVs and allows for command and control of UAVs, and satellite imagery datalink 119 which provides imagery obtained from satellite cameras. Interface module 113 may receive data from external systems 113 and provide this information to embedded electronic systems 103. Interface module 113 may also provide information from embedded electronic systems 103 to external systems that are consumers of this information. For example, if one of sensors 107 is an infrared sensor, interface module 113 may provide infrared imagery obtained via this sensor to an external consumer of this information, such as, for example, other vehicles in the same geographic area or a command and control center which may use this information to make strategic decisions.

In the example of FIG. 1, external systems 114 serve as sources of information for embedded systems 103. However, the invention is not limited in this respect, as external systems 114 may include systems that receive data from embedded electronic systems 103. Indeed, some external systems may both provide information to and receive information from the embedded electronic systems. Further, in the example of FIG. 1, three external systems are shown (i.e., systems 115, 117, and 199). These systems are shown merely as examples of the types of systems that may communicate with the systems on-board vehicle 101 and of the types of data that may be provided. However, the invention is not limited in this respect as interface module 113 may interface with any number or type of external systems. Similarly, in the example of FIG. 1, three types of embedded electronic systems are shown in vehicle 101 (i.e., displays 105, sensors 107, and mission computer 109). It should be understood that these are merely examples of the types of on-board electronic systems for which interface module 113 serves as an interface, and that interface module 113 may serve as an interface for any number of type of embedded electronic systems, as the invention is not limited in this respect.

As discussed above, interface module 113 may provide information from external systems 113 to embedded electronic systems 103. This may be done in any suitable way, as the invention is not limited in this respect. One example of an interface module 113 that may be used in some embodiments of the invention is shown in FIG. 2.

Figure 2:
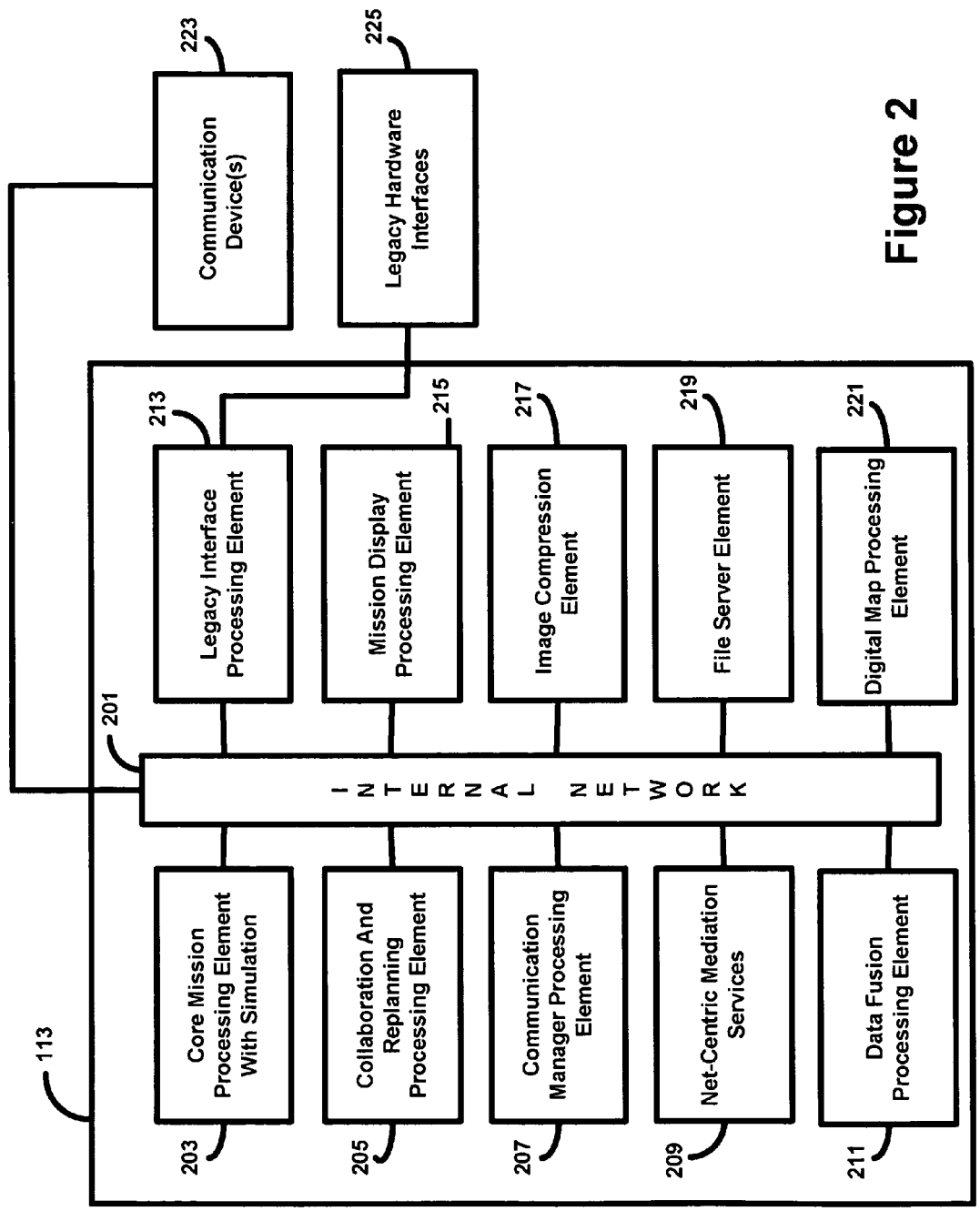
FIG. 2 is a block diagram of an interface module having a peer-to-peer architecture, in accordance with one embodiment.

In FIG. 2, interface module 113 includes an internal network 201 and components 203-221. Information may be received from an external system or network via one or more of communication device(s) 223 and placed on internal network 201. Communication devices 223 may include, for example, legacy (i.e., pre-existing) communication devices of the vehicle and/or additional communication devices added to the vehicle to enable communication with external systems. Communication devices 223 may include, for example, radios and/or other wireless communication devices.

Each of components 221-223 acts as a peer on internal network 201. That is, each component may listen for information placed on internal network 201, determine, based on the content of the information, if the information is intended for it, and if so, process the information.

The components on internal network 201 may enable operation of the embedded electronic systems with external systems by re-formatting information so that it is in a format which is suitable for use by an embedded electronic system or an external system that is an intended recipient of data, by managing incoming and outgoing data and the hardware resources used to send and receive such data, and by providing additional functionality that enables the embedded electronic systems to make use of new types of information provided from external systems.

For example, components 213, 215, 217, 209, and 211 may be used in the reformatting of data. That is, legacy interface processing element 213 may serve as an interface to the embedded electronic systems of the vehicle. As discussed above, embedded components frequently employ specialized protocols and interfaces. Legacy interface processing element may be capable of accessing the interface used by an embedded system and sending information to the system according to the protocol that it uses.

Thus, for example, legacy interface processing element 213 determines if information on internal network 201 is intended for one of the embedded electronic systems of the vehicle and, if so, retrieves the information, converts it to a form that the destination electronic system can understand, and sends the information to the system. Legacy interface processing element 213 may also retrieve information from the embedded electronic systems and provide this information to external systems via one or more of communication devices 223. Legacy interface processing element 213 interfaces with embedded systems using legacy hardware interfaces 225. These hardware interfaces allow interface module 113 to connect to the legacy communication networks and buses used by the embedded electronic systems.

Mission Display Processing Element 215 may provide the capability to communicate information between the interface module and the operator via operator control(s) and/or display(s). That is, for example, some information that is desired to be communicated between the interface module and the operator may not be able to be readily processed (or processed at all) by the embedded electronic systems of the vehicle. For example, the interface module may provide a new capability for presenting UAV image data to the operator, while the existing embedded electronic systems are not capable of presenting this information to the operator. Thus, Mission Display Processing Element 215 may present this information to the operator and receive control input from the operator. In some embodiments, Mission Display Processing Element 215 may communicate with an additional operator control and display unit that is added to enable display of the new type of information. In other embodiments, Mission Display Processing Element 215 may communicate with an existing operator control and display unit. This may be done in any suitable way, such as, for example, through unused or spare display pages, display overlay or control keys, or in any other suitable way.

Real-Time Image Compression Element 217 may receive image data provided from one or more of the embedded electronic systems and compresses the image data so that it is in a format suitable for transmission to an external system. Net-Centric Mediation Services Element 209 provides data translation functionality. For example, element 209 may translate data from one format to another, or may perform conversions, such as, for example, translating standard units to metric units.

Data Fusion Processing Element 211 may combine individual pieces of data that are associated with the same logical object. For example, the interface module may receive multiple data reports regarding the same target from multiple sensors (e.g., radar, infrared sensors, electronic support measures sensors, or any other suitable sensors). Data Fusion Processing Element 211 may determine that the reports received from these sensors are for the same target and may combine the information into a single report that includes a composite set of attributes for the target. This may reduce the number of reports that an operator of the vehicle or other systems need to process and the composite report may facilitate a better understanding of the target than separately reviewing the individual reports.

Components 203, 207, and 219, for example, may provide management capabilities. That is, Core Mission Processing Element with Simulation 203 may support simulated operation for use in system testing and operator training. This component may provide simulations of existing embedded systems of the vehicle or new systems to be added to the vehicle and may simulate information from flow from such systems. Additionally, this element may provide simulations of external systems to mimic information flow from those systems.

Communication Manager Processing Element 207 manages any of communication devices 223 added to communicate with external systems. Thus, for example, if an additional radio is added to communicate with external systems, communication manager processing element 207 may control the operation of the radio, such as for example, powering it on and off, tuning it, and other management functions.

File Server Element 219 may provide a storage capability within the interface module. For example, this element may provide persistent storage of data on magnetic disk, solid state memory, or other non-volatile memory, or may provide temporary storage to maintain information during operations or missions.

Components 205 and 221 may provide additional functionality for the embedded electronic systems of the vehicle. For example, digital map processing element 221 that receives location information of points of interest (e.g., enemy positions, targets, friendlies, current position of vehicle) and generates a digital map that marks the location of these points of interest. The digital map may then be sent to one or more of the embedded electronic systems for display to a vehicle operator or passenger. Collaboration and replanning processing element 205 may provide an online meeting or whiteboard functionality to allow multiple geographically disparate vehicles to electronically conference. Thus, for example, an collaboration and replanning processing element may process the net-meeting/whiteboard data and may send information to an embedded display or monitor of the vehicle.

Components 203-221 are merely examples provided to illustrate the types of functionality that may be provided to embedded electronic systems via interface module 113. It should be appreciated that additional components may be added to provide additional types of functionality and the invention is not limited with respect to the number of components in interface module 113 or the types of functionality that these components provide.

Interface module 113 and its components may be implemented in any suitable way, as the invention is not limited in this respect. For example, components 203-221 may be implemented in hardware or software, or any combination thereof. In some embodiments, each of components 203-221 may be implemented as a separate application program executing on a single processor or may be implemented as separate threads of a single application program executing on a single processor. However, the invention is not limited in this respect, as when implemented in software, these components need not all execute on the same processor, as any suitable number of processors may be used (including, for example, one processor for each component). Alternatively, in some embodiments, each component of the interface module may implemented on a separate computer, having its own processing and memory resources.

Further, any suitable physical package may be used for interface module 113. For example, in some embodiments, the interface module may be housed in a roll-on/roll-off (RO/RO) rack that may be rolled on to a vehicle and connected to the existing embedded systems of the vehicle. In some embodiments, the software components of interface module 113 may execute on one or more processors of the existing embedded electronic systems. For example, in some embodiments, these components may execute on the flight computer of an aircraft. Using the existing processors of the embedded electronic systems may be particularly beneficial when there are space or weight limitations imposed by the vehicle.

As discussed above, interface module 113, shown in FIG. 2, allows existing embedded electronic systems to operate with external systems without significantly modifying the existing embedded electronic systems. Further, Applicants have appreciated that, in some situations, it may be desirable to add new embedded electronic systems to a vehicle and to allow these new electronic systems to interoperate with the existing embedded electronic system. Thus, in some embodiments, interface module 113 may be used to interface existing embedded electronic systems with newly added electronic systems, without making significant modifications the existing embedded electronic systems. This may be done in any suitable way, as the invention is not limited in this respect.

For example, it may be desired to add to an aircraft an infrared camera system for use, for example, in detecting objects at night that are not visible to the pilot. It may be desirable to provide information about any detected objects to the aircraft's existing flight computer (e.g., so that the flight computer can compute a flight path that avoids these objects). Thus, for example, interface module 113 may interface with the infrared camera system and receive image data from the infrared camera (e.g., via interface processing element 213), process the image data, for example, to locate any potential obstacles, format that information into a format suitable for use by the flight computer, and send the information to the flight computer so that the flight computer may re-compute the aircraft's flight path.

In addition, in some situations it may be desirable to add additional functionality to existing embedded electronic systems of a vehicle without significantly modifying these systems. Thus, in some embodiments, such capabilities may be implemented in interface module 113 without requiring further modification to the embedded electronic systems. For example, if it is desired to add to interface module 113 the capability to communicate with a new external system, one or more additional components may be added to interface module 113 (and/or existing components may be modified) to process data received from the new external system and send the data to one or more of the existing embedded electronic systems. Thus, modifications to interface module 113 may be made to enable the embedded electronic systems to communicate with additional external systems, without having to significantly modify the embedded electronic systems.

Applicants have appreciated that, in some situations, information received from an external system may be sensitive. Thus, it may be desirable in some situations to allow only the components of interface module 113 and the embedded systems of the vehicle that are intended to receive this information to have access to this information. However, as discussed above, in some embodiments, internal network 201 of interface module 113 is a peer-to-peer network in which each of components 203-221 is a peer. Thus, information placed on internal network 201 may be accessible by any of components 203-221. However, when sensitive information is placed on the internal network 201, it is desirable to prevent unauthorized components of interface module 113 from having the ability to access this information. Thus, in some embodiments of the invention components that are not intended recipients of sensitive information are blocked from receiving this information. This may be done in any suitable way, as the invention is not limited in this respect.

For example, in one embodiment, each component may operate as an application program on a system that runs a certified operating system. The operating systems of each system may be synchronized and certain time slots may be designated for sensitive communications. Thus, for example, the first 10 milliseconds of every second may be used for classified communications. If a component is not authorized to receive sensitive information, the operating system for that component may disable network communications for the period of time designated for sensitive communications. Thus, the operating system prevents components that are not authorized to receive sensitive information from accessing this data.

Applicants have further appreciated that it may be desirable to test interface module 113 to verify the capabilities of the interface module 113. This may be done, for example, prior to installing the interface module in a vehicle and/or when adding new components to the interface module after it has been installed in a vehicle. Thus, in some embodiments, interface module 113 may be capable of interfacing with a simulation environment that simulates external systems. The simulation environment may simulate external systems by sending information to interface module 113 similar to the information that the external systems would send.

The simulation environment may interface with the interface module in any suitable way, as the invention is not limited in this respect. For example, in some embodiments the simulation environment may communicate with interface module 113 by sending information to or receiving information from one or more of communication devices 223. Alternatively, in some embodiments, the simulation environment may coupled with internal network 201 of interface module 113.

As described in above, interface module 113 may provide the capability to interface existing embedded electronic systems with external systems (e.g., the Global Information Grid), to interface existing embedded electronic systems with newly added embedded electronic systems, and to add new functionality to existing embedded electronic systems. However, the peer-to-peer networking architecture used by interface module 113 presents challenges in adapting to changes in the embedded electronic systems of a vehicle, as well as changes in the external systems with which it is desired to allow the embedded systems to communicate.

For example, in interface module 113, each component on internal network 201 supports peer interactions over the internal network. Thus, if an additional component is added to the network (e.g., to provide new functionality to the embedded systems, to interface existing embedded systems with a new external system, or to interface existing embedded systems with a new embedded system), modifications to the other components on the network may, in some situations, be needed to support peer-to-peer interaction with the new component. Further, the external networks with which it is desired for the interface module to interface may change over time (e.g., modifications may be made to the external networks or new external networks with which it is desired to interface may come into existence). As the external networks change, many components on the internal network may have to be modified to adapt to these changes.

In addition, some external networks, such as the GIG, communicate according to a set of standards. This is advantageous, as it permits newly developed systems to interoperate with these networks by designing these systems to operate according to the standards used by the external networks. However, the use of these standards may require each component on the internal network of interface module 113 to support interaction with these standards. Further, such standards frequently change over time and, as these standards evolve, multiple (or all) of the components on the internal network may need to be modified to accommodate these changes.

Moreover, external networks, such as the GIG, may become unavailable due to, for example, communication interruptions. These interruptions may be caused, for example, by interference on the communications channel, hardware failure in communication devices, or other causes. Because of the peer-to-peer architecture of the internal network of interface module 113, each component may have to individually handle service interruptions.

Further, when new functionality is added to interface module 113 (e.g., a new application to process information), the system operation may have to be redesigned to accommodate a new component that performs the new functionality or one or more existing components may have to modified to perform the new functionality. Either of these approaches may require time-consuming integration and testing.

Thus, in some embodiments, an interface module having a centralized architecture may be used. Such an interface module may address the limitations described above in connection with an interface module having a peer-to-peer architecture (i.e., interface module 113). However, the invention is not limited in this respect as, in some embodiments, the interface module may address only some of these limitations and, in some embodiments, the interface module may not address any of these limitations.

Figure 3:
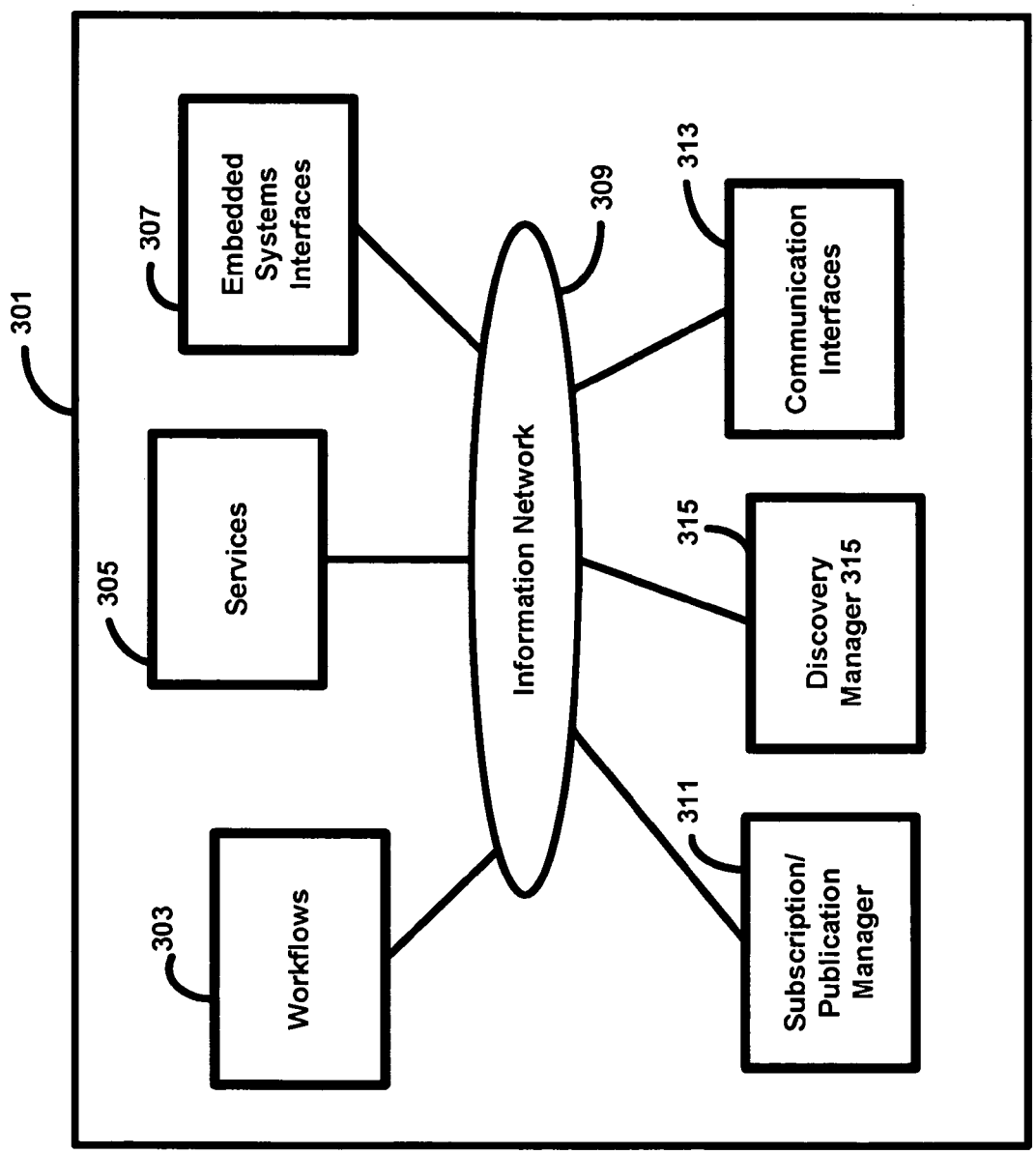
FIG. 3 is a block diagram of an interface module having a centralized architecture, in accordance with one embodiment.

One example of an interface module 301 having a centralized architecture is shown in FIG. 3. Interface module 301 includes workflows 303, services 305, embedded systems interfaces 307, subscription/publication manager 311, communication interfaces 313, and discovery manager 315. These components may communicate with each other via information network 309. Workflows 303 serve as central managers for information coming into and out of interface module 313.

Services 305 are components that provide library functions. For example, in some embodiments, services provided in interface module 301 may include a digital map processing service (e.g., a service that provides the functionality of digital map processing element 221) or a collaboration and replanning service (e.g., a service that provides the functionality of collaboration and replanning element 205). It should be appreciated that these are merely two examples of the types of services that may be provided in interface module 301 and that the invention is not limited to any number or type of services. In some embodiments, interface module 301 may provide a service container capability. That is, the service container may provide extra computing resources to allow for new services to be added to the adapter. The services in the service container may interact with interface module 301 in a manner similar to that of the embedded electronic systems of the vehicle, except that these services may run in the same environment (e.g., the same computing hardware, application framework, and/or operating system) as interface module 301.

Embedded system interfaces 307 are interfaces that interface interface module 301 with the embedded electronic systems of a vehicle. In some embodiments, interface module 301 may include an embedded system interface for each embedded electronics system or device, or type of system or device in the vehicle in which interface module 301 is employed. For example, in some embodiments in which interface module 301 is employed in an aircraft, embedded system interfaces 307 may include a "1553 interface" to interface interface module 301 with the existing Military Standard 1553 (i.e., MIL-STD-1553) bus used by the aircraft avionics. Such an interface allows interface module 301 to receive information from and send information to the embedded electronic systems that communicate using the 1553 avionics bus.

Subscription/Publication Manager 311 manages subscriptions to information provided by external networks or systems and publication of information provided from the vehicle's embedded electronic systems to external networks or systems. Thus, for example, if one of the embedded electronic systems of the vehicle uses information from real-time intelligence feeds provided by an external system, subscription manager 311 may establish a subscription with the external source of this data so that the external source provides the information on a continuous basis. Subscription/Publication Manager 311 may manage these subscriptions by, for example, selecting what information should be provided from the external data source, ensuring that the subscriptions remain current, renewing subscriptions if required, and/or performing any other subscription management functions.

Subscription/Publication Manager 311 may also manage subscriptions from external systems or networks to information provided by interface module 301. For example, if the vehicle in which an interface module is employed is an aircraft that includes, for example, a camera for photographing the terrain over which it is flying, it may desirable to provide the photographs taken by this camera to terrestrial locations (e.g., a command and control center and/or infantry or armored cavalry units in the area). Thus, for example, terrestrial systems may subscribe to interface module 301 so that interface module 301 provides the photographs to these systems on a continuous basis. Subscription/Publication Manager 311 may manage such subscriptions by, for example, ensuring that the appropriate data is sent to the appropriate subscriber.

Communication Interfaces 313 are interfaces between interface module 301 and communication devices used to communicate with external networks. For example, in some embodiments, a joint tactical radio system (JTRS) radio may be used to send information to and receive information from external networks and systems. Thus, communications interfaces 313 may include an interface that interfaces information network 309 of interface module 301 with the JTRS radio. It should be appreciated that this only example of a communication interface that may be used and that the invention is not limited to any number or type of communication interface.

Discovery Manager 315 manages discovery of external systems that may be used as sources of data for interface module 301. It may also manage registration of interface module 301 as a source of data to external systems. For example, if interface module 301 desires to receive intelligence data on enemy locations to provide to an embedded electronic system, discovery manager 315 may discover any external systems or networks that have this information available. Similarly, if interface module 301 provides imagery data generated by an embedded electronic system, discover manager 315 may register the availability of that data to external systems.

As discussed above, workflows 303 are managers of information coming into and out of interface module 301. That is, a workflow defines what information is needed or desired, which external networks or systems and/or embedded systems produce that information, which external networks and/or embedded systems consume that information, how to interface with external systems, what processing of that information should be done before sending the information to its ultimate destination, and/or any other information flow specifications. In some embodiments, a separate workflow may be defined for each type of information that the interface module 301 receives. For example, separate workflows may be defined for real-time intelligence information, map information, infrared imagery, and any other type of information that interface module 301 receives. Thus, a workflow may interface with the external systems that provide the type of data that it manages. However, the invention is not limited in this respect as a separate workflow need not be defined for each type of information and, in some embodiments, a single workflow may define the flow of information for multiple types of information.

Workflows may manage information flow in any suitable way, as the invention is not limited in this respect. For example, in some embodiments in which interface module 301 is employed in an aircraft, one of the existing embedded electronic systems of the aircraft may be a route planner that uses information including current location of the aircraft, destination of the aircraft, intelligence information (e.g., information on the locations of enemies and friendlies), and geographic information (e.g., information on the terrain of the location in which the aircraft is located) and generates a route for the aircraft, taking into account the geography and known threats in the area (and potentially using the geography to avoid detection by these threats). Thus, it may be desirable to provide the route planner with up-to-date map information and intelligence information so that the route planner has more recent information to use in generating a route.

Without information provided to it via interface module 301, the only information that the route planner may have available is the map and intelligence information loaded prior to take-off, and any intelligence information obtained from on-board sensors. The route planner would not have the ability to obtain updated map or intelligence information from, for example, other friendly aircraft or terrestrial vehicles in the area.

Thus, in some embodiments, the route planner may express a desire for map and intelligence information via an interface for the route planner (e.g., one of embedded systems interfaces 307). One of workflows 303 may be, for example, a workflow that manages intelligence information and another workflow of workflows 303 may be, for example, a workflow that manages map information. The workflow that manages intelligence information may learn of the route planner's desire for intelligence information from embedded system interface 307. This workflow may then request that discovery manager 315 perform a discovery of sources of intelligence information on, for example, the locations of hostiles and/or friendlies in the area. Discovery manager 315 may inform the workflow of any discovered external systems that are available to provide such information. The workflow may then connect to one or more of the external systems discovered by Discovery Manger 315 (e.g., via one or more of communication interfaces 313) and request intelligence information from these systems. Alternatively, in some embodiments, the workflow may subscribe to these systems (e.g., via Subscription/Publication Manager 311) so that these systems may provide information to interface module 301 on a continuous basis, without interface module 301 having to repeatedly request the information. Once the requested intelligence information is received from the external system, workflow 303 may provide this information to the route planner via the interface 307 for the route planner.

As discussed above, the route planner may also express a desire for map data. A separate workflow may obtain map data from an external system for the route planner in a manner similar to that described above in connection with the intelligence information workflow. However, in some embodiments, the workflow may not need to obtain information for an embedded system from an external source, as there may be a source of that data in the vehicle. For example, in some embodiments, one of services 305 may be a map server that is capable of generating maps from a database of map data on the vehicle. Thus, rather than connect to an external system for obtaining map data, the map data workflow may request the desired maps from the map server utility and provide this information to the route planner via the interface 307 for the route planner. In some situations, when the map data workflow requests a map from the map server utility, the map server utility may respond by indicating that it does not have the requested map. In such a situation, the map data workflow may then obtain the desired map from an external system in a manner similar to that described above in connection with the intelligence information workflow.

In the example above, the route planner was capable of expressing a desire for intelligence information and map data. However, Applicants have appreciated that, in some embodiments, an embedded electronic system may not be capable of expressing a desire for or requesting information from an external system (e.g., because the system was designed to operate using only data pre-loaded into the system). In such situations, in some embodiments, the workflow may be aware that the embedded system is incapable of requesting data and, rather than wait for a request from the embedded system for data, may anticipate that the embedded system could use certain information and provide that information the embedded system without it having been requested to do so. Alternatively, in some embodiments, a human operator may request that interface module 301 provide certain information to the embedded system (e.g., via a human interface of the vehicle's embedded electronic systems, via a human interface to interface module 301, or in any other suitable way). Alternatively, in some embodiments, the embedded system may send requests to existing internal systems for data. Interface module 301 may intercept these requests and provide updated data from, for example, external sources or other on-board sources, to the embedded system. Alternatively, in some embodiments, the embedded system itself may be modified so that is capable of obtaining data from external sources.

Applicants have appreciated that in some situations, communication links may not be available (e.g., due to interference on the channel, hardware failure, or other reasons) and thus it may not be possible to obtain information from external systems or networks. Thus, in some embodiments, workflows may cache information received from external systems. If an external system is unavailable (e.g., due to a service interruption), the workflows may provide the cached information to embedded systems, for example, until more recent information from externals systems can be obtained.

Interface module 301 and its components may be implemented in any suitable way, as the invention is not limited in this respect. In some embodiments, interface module 301 may employ a service-oriented architecture (SOA) to facilitate communication with external systems and to facilitate communication between the internal components of interface module 301. SOA is a set of standards that support machine to machine and interprocess interaction, including message passing and discovery of available services. SOA is intended to provide loose coupling between systems. That is, SOA provides a set of generic interfaces that every SOA system uses and the ability to deliver application-specific messages via these interfaces. The content, format, and structure of the application-specific messages are defined by extensible schema that may also be passed through the interface. Thus, in some embodiments, interface module 301 may employ SOA interfaces to communicate with external systems.

In interface module 301, because workflows 303 interface with external systems, if the interface that an external system uses changes, in some embodiments only the workflows that interface with the external system may be modified. Thus, in some embodiments, it may not be necessary to modify other internal components of interface module 301. Although in some embodiments or situations it may be necessary to modify other internal components of interface module 301 to accommodate changes in the interfaces used by external systems, such modifications may not be as extensive as they would without use of an interface module such as interface module 301.

Further, if it is desired to operate with an additional external system that provides a new type of data, a new workflow may be added to interface with the additional system and handle the new type of data that the external system provides. It is not necessary to modify any of the other existing components of interface module 301 to enable interoperation with the new external system.

Further, because workflows 303 route information among the internal components of interface module 301, it is not required that the internal components be designed to work with each other. Further, new services (e.g., that provide additional functionality) may be added to the system without requiring modifications to the other services or interfaces of the interface module. Rather, workflows 303 may be modified to take utilize any new services added to the system. In addition, workflows 303 may handle any service interruptions (e.g., by providing cached information during service interruptions) so that the other components need not each individually have the capability to handle such interruptions.

In some embodiments, interface module 301 may be implemented using a component framework. That is, a number of types of components may be defined, and an interface may be defined for each of the types of components. Each of the internal components of interface module 301 may be implemented according to one of these defined interfaces.

One example of a component framework that may be used in some embodiments is shown in FIG. 4. In the example of a FIG. 4, five types of components are defined: utility components 401, external interfaces 403, platform policy components 405, mission workflow components 407, and legacy interface components 409.

Legacy interface components 409 are components that interface with the embedded electronic systems of a vehicle. These components may monitor for events or messages from the embedded systems, transform information from a external message into a format usable by an embedded system (e.g., using a transformation utility), manage I/O devices and channels, and track the state of the embedded systems. Thus, for example, embedded systems interface 307 of interface module 301, may be implemented as legacy interface components.

Mission Workflow components 407 orchestrate the services used to satisfy the information desired for a particular mission or application. These components may be invoked on an mission or application-related event or request and may handle flow logic and policy specific to a particular mission or application. These components may be capable of modifying, aggregating, correlating, and routing messages. Thus, for example, workflows 303 of interface module 301 may be implemented as Mission Workflow components 407.

Platform Policy components 405 are components that provide a system-wide functionality that is not specific to a particular mission or application. These components may enforce system policies that are not specific to any particular mission or application. Such components may be invoked when specific message types are received or when an endpoint is accessed by an external agent (e.g., for authentication purposes). For example, a mission commander may have a policy that there should be radio silence between all vehicles participating in the system during certain stage of the mission. The interface module may include a platform policy component that checks when radio communication is permitted and enforces the policy of radio silence when radio communication is not permitted. Other examples of platform policy components are Subscription/Publication Manager 311 and Discovery Manager 315 of interface module 301.

External Interfaces 403 are components that manage information flow across standard interfaces between external systems and the internal information network of interface module 301. These components may be invoked when called by a client or when relevant information is receive via the information network and may service any calls by performing any required transformation and invoking other components of interface module 301 to handle received information. These components also manage responses from the components that handle the received information and return any applicable service response to the client. Examples of External Interface components are Communication Interfaces 313 of interface module 301.

Utility Components 401 are components that provide library functions for use by the other components. For example, utility components may provide caching functionality or may be capable for transforming information from one format to another. Services 305 of interface module 301 are examples of utility components.

Component Programming Interfaces 411 are defined interfaces for each type of components. Thus, for example, there an interface may be defined for each of component types 401, 403, 405, 407, and 409. That is, for example, Mission Workflow components 407 may implement the Mission Workflow Component Programming Interface and Platform Policy components 405 may implement the Platform Policy Component Programming Interface. Providing a standard interface for each type of component class promotes consistency, interchangeability, and composability of components. For example, the Component Programming Interface for a type of component may define a system for authentication and access control. The system for authentication and access control defined by the Component Programming Interface may be the system that is used by the external systems with which the interface module communicates. If the system for authentication and access control used by these external systems changes, the interface module may accommodate this change by modifying the Component Programming Interface, without having to change the underlying components themselves.

Platform Integration Target Framework Abstraction Layer 413 may be, for example, a software layer that interfaces the Component Programming Interfaces implemented by the components of the interface module to the component application programming interface (API) of the Application Framework that interface module 301 uses.

Application Framework 415 is an application framework used by the interface module. Examples of commercially-available application frameworks include the Java 2 Platform, Enterprise Edition (J2EE) and the OSGi application framework.

Java Runtime Environment is a program that executes Java bytecode programs. That is, it serves as interpreter for programs (e.g. components). It should be appreciated that the Java Runtime Environment is one example an interpreter that may be used. However, the invention is not limited in this respect, as any interpreter or compiler may be used in the execution of programs.

Computer Platform 419 is the underlying hardware and operating system on which the higher layers execute. Any suitable processing hardware and operating system may be used, as the invention is not limited in this respect.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention.

The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user).

The phraseology and terminology used herein is for the purpose of description and should not be regarded as limiting. The use of "including," "comprising," "having," "containing," "involving," and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of providing access to a plurality of embedded systems in a vehicle via an interface module comprising acts of:
   receiving, at the interface module, information from a system external to the vehicle;
   determining, at the interface module, at least one of the plurality embedded systems to which to provide the information; and
   providing the information from the interface module to the at least one of the plurality of embedded systems.

2. The method of claim 1, wherein the interface module includes an internal peer-to-peer network and a plurality of components that communicate as peers on the internal network, and wherein the act of receiving information from the system external to the vehicle comprises receiving the information on the internal network and wherein the act of determining the at least one of the plurality of embedded systems to which to provide the information by analyzing the information at least one of the plurality of components.

3. The method of claim 2, wherein the plurality of components comprise a plurality of interfaces, which each interface with at least one of the plurality of embedded systems, and wherein the act of analyzing the information at least one of the plurality of components comprises analyzing the information at least one of the plurality of interfaces.

4. The method of claim 1, wherein the act of determining at least one of the plurality of embedded systems to which to provide the information comprises an act of determining the at least one of the plurality of embedded systems to which to provide the information based on a type of the information.

5. The method of claim 1, wherein the act of determining at least one of the plurality of embedded systems to which to provide the information comprises an act of determining the at least one of the plurality of embedded systems to which to provide the information based on a type of the system external to the vehicle from which the information was received.

6. The method of claim 1, wherein the act of determining at least one of the plurality of embedded systems to which to provide the information comprises an act of determining the at least one of the plurality of embedded systems to which to provide the information based on a security classification of the information.

7. The method of claim 1, wherein the act of providing the information from the interface module to the at least one of the plurality of embedded systems further comprises an act of transforming the information to a format usable by the at least one of the plurality of embedded systems.

8. The method of claim 2, wherein the plurality of components includes at least one component that provides at least one network enterprise service to support communication between network nodes.

9. The method of claim 2, wherein the plurality of components includes at least one component capable of simulating information provided by at least one of the plurality of embedded systems or an external system.

10. The method of claim 2, wherein the system external to the vehicle is a first external system and wherein the method further comprises an act of
adding an additional component to the interface module to enable the interface module to process information from a second external system.

11. An interface module for providing access to a plurality of embedded systems in a vehicle comprising:
at least one external interface configured to receive information from a system external to the vehicle; and
at least one component to determine at least one of the plurality embedded systems to which to provide the information and provide the information from the interface module to the at least one of the plurality of embedded systems.

12. The interface module of claim 11, further comprising:
an internal peer-to-peer network which receives the information from the at least one external interface; and
a plurality of components that communicate as peers on the internal network that determine the at least one of the plurality of embedded systems to which to provide the information by analyzing the information.

13. The interface module of claim 12, wherein the at least one component comprises a plurality of interfaces, which each interface with at least one of the plurality of embedded systems and are configured to analyze the information.

14. The interface module of claim 11, wherein the at least one component determines the at least one of the plurality of embedded systems to which to provide the information based on a type of the information.

15. The interface module of claim 11, wherein the at least one component determines the at least one of the plurality of embedded systems to which to provide the information based on a type of the system external to the vehicle from which the information was received.

16. The interface module of claim 11, wherein the at least one component determines the at least one of the plurality of embedded systems to which to provide the information based on a security classification of the information.

17. The interface module of claim 11, wherein the at least one component transforms the information to a format usable by the at least one of the plurality of embedded systems.

18. The interface module of claim 12, wherein the plurality of components includes at least one component that provides at least one network enterprise service to support communication between network nodes.

19. The interface module of claim 12, wherein the plurality of components includes at least one component capable of simulating information provided by at least one of the plurality of embedded systems or an external system.

20. A method of providing access to a plurality of embedded systems in a vehicle via an interface module comprising acts of:
receiving, at the interface module, information from at least one of the plurality of embedded systems;
determining, at the interface module, at least one system external to the vehicle to which to provide the information; and
providing the information from the interface module to the at least one system external to the vehicle.

21. The method of claim 20, wherein the interface module includes an internal peer-to-peer network and a plurality of components that communicate as peers on the internal network, and wherein the act of receiving information from the at least one of the plurality of embedded systems comprises receiving the information on the internal network and wherein the act of determining the at least system external to the vehicle to which to provide the information by analyzing the information at least one of the plurality of components.

22. The method of claim 21, wherein the plurality of components comprise a plurality of interfaces, which each interface with at least one system external to the vehicle, and wherein the act of analyzing the information at least one of the plurality of components comprises analyzing the information at least one of the plurality of interfaces.

23. The method of claim 20, wherein the act of determining at least one system external to the vehicle to which to provide the information comprises an act of determining the at least one system external to the vehicle to which to provide the information based on a type of the information.

24. The method of claim 20, wherein the act of determining at least one system external to the vehicle to which to provide the information comprises an act of determining the at least one system external to the vehicle to which to provide the information based on a type of the system external to the vehicle from which the information was received.

25. The method of claim 20, wherein the act of providing the information from the interface module to the at least one system external to the vehicle further comprises an act of transforming the information to a format usable by the at least one system external to the vehicle.

26. The method of claim 20, wherein the system external to the vehicle is a first external system and wherein the method further comprises an act of
adding an additional component to the interface module to enable the interface module to send information to a second external system.

27. The method of claim 20, wherein the act of determining at least one system external to the vehicle to which to provide the information comprises an act of determining the at least one system external to the vehicle to which to provide the information based on a security classification of the information.

28. The method of claim 21, wherein the plurality of components includes at least one component that provides at least one network enterprise service to support communication between network nodes.

29. The method of claim 21, wherein the plurality of components includes at least one component capable of simulating information provided by at least one of the plurality of embedded systems or an external system.

30. A system for use in a vehicle comprising:
a plurality of embedded electronic systems in a vehicle; and
an interface module that receives information from a system external to the vehicle, determines at least one of the plurality embedded systems to which to provide the information, and provides the information to the at least one of the plurality of embedded systems.

31. The system of claim 30, wherein the interface module determines the at least one of the plurality of embedded systems to which to provide the information based on a type of the information.

32. The system of claim 30, wherein the interface module determines the at least one of the plurality of embedded systems to which to provide the information based on a type of the system external to the vehicle from which the information was received.

33. The system of claim 30, wherein the interface module determines the at least one of the plurality of embedded systems to which to provide the information based on a security classification of the information.

* * * * *